United States Patent [19]
Bechthold et al.

[11] Patent Number: 4,564,510
[45] Date of Patent: Jan. 14, 1986

[54] METHOD FOR REMOVING NITROGEN OXIDES FROM WASTE GASES

[75] Inventors: Horst Bechthold, Erftstadt-Friesheim; Heinz J. Fischer, Neunkirchen-Seelscheid; Wolfgang Schulte, Monheim, all of Fed. Rep. of Germany

[73] Assignee: Buckau-Walther Aktiengesellschaft, Grevenbroich, Fed. Rep. of Germany

[21] Appl. No.: 517,789

[22] Filed: Jul. 27, 1983

[30] Foreign Application Priority Data

Sep. 8, 1982 [DE] Fed. Rep. of Germany ....... 3233316

[51] Int. Cl.$^4$ .................. C01B 21/00; C01B 21/48; C01C 1/18
[52] U.S. Cl. .................................. 423/235; 423/395; 423/396
[58] Field of Search ............... 423/235, 395, 396, 397; 71/58, 61

[56] References Cited

U.S. PATENT DOCUMENTS

| 3,453,071 | 7/1969 | Schmitt et al. | 423/396 |
| 4,029,739 | 6/1977 | Senjo et al. | 423/235 |
| 4,425,313 | 1/1984 | Cooper | 423/235 |
| 4,426,364 | 1/1984 | Cooper | 423/235 |

Primary Examiner—Gregory A. Heller
Attorney, Agent, or Firm—Peter K. Kontler

[57] ABSTRACT

A method is provided for removing nitrogen oxides from waste gases, said method comprising the steps of oxidizing the nitrogen oxides in the waste gases by contacting the waste gases in a gas phase with an oxidizing agent to form $NO_2$; absorbing the formed $NO_2$ in an absorbing stage by contacting the oxidized waste gases with an absorbing agent to form an absorbing product while substituting fresh water for vaporized water in corresponding amounts; and processing the resultant absorbing product as a solution.

4 Claims, 1 Drawing Figure

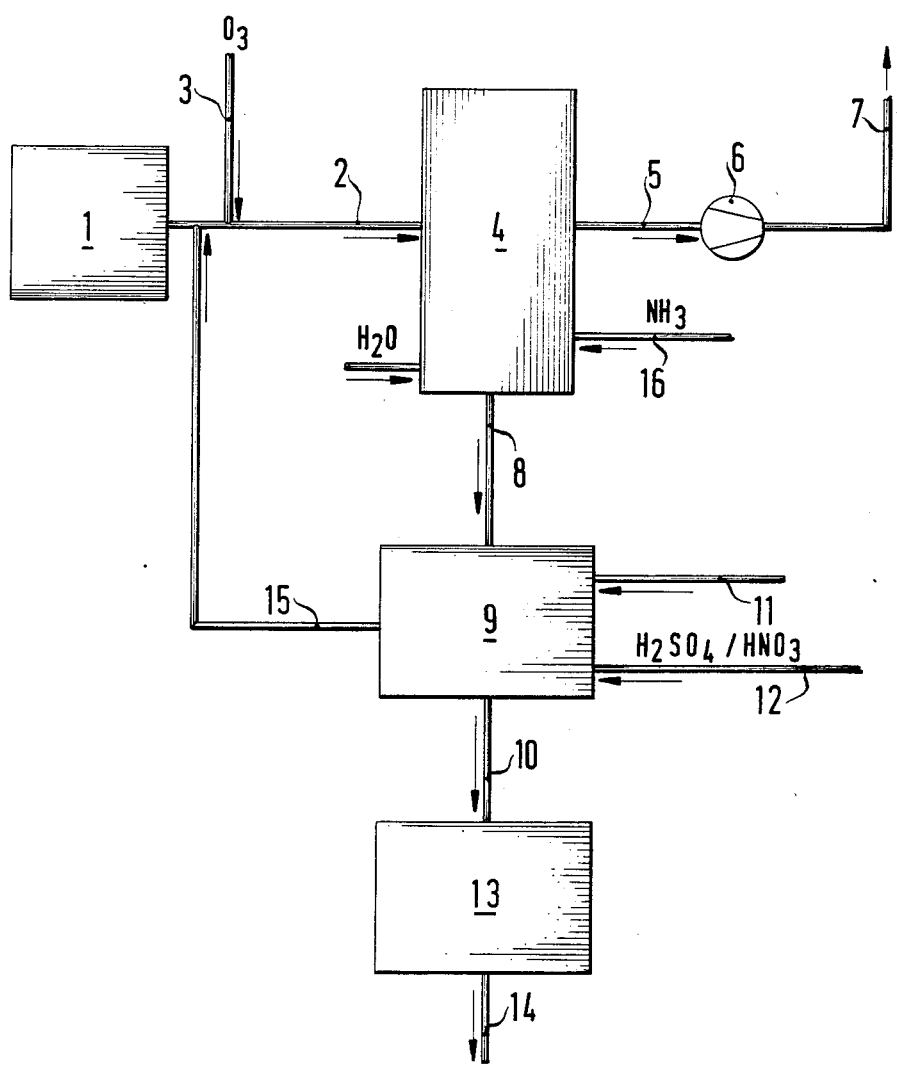

METHOD FOR REMOVING NITROGEN OXIDES FROM WASTE GASES

BACKGROUND OF THE INVENTION

The present invention relates generally to a method for removing nitrogen oxides from waste gases and, more particularly, to such a method wherein the waste gases from which the nitrogen oxides are to be removed are treated with an absorbing fluid so as to absorb the nitrogen oxides and, further, wherein vaporized water from the waste gases is substituted with an appropriate amount of fresh water.

Using such a method, the waste gases may be treated in such a manner that dry ammonium sulfate is obtained which may thereupon be used as a fertilizer. The $NO_x$ present in the waste gases is simultaneously separated from the waste gases to such an extent that a mixed fertilizer from ammonium sulfate and ammonium nitrate is available. The mixing proportions of the two components may be readily adjusted to meet market demands.

Heretofore, prior art methods did not permit such a complete removal of nitrogen oxides from the waste gases or the subsequent utilization of the separated $NO_x$ components for use as fertilizer in adjustable mixing proportions.

OBJECTS AND SUMMARY OF THE INVENTION

An object of the present invention is to provide a method for removing nitrogen oxides from waste gases of furnaces, nitric acid plants or factories and in the residual gases of different plants or factories which use nitric acid.

It is another object of the present invention to provide such a method wherein the waste gases from which the nitrogen oxides are to be separated are contacted in the gas phase with an oxidizing agent so as to oxidize the nitrogen oxides contained therein.

It is still another object of the present invention to provide such a method wherein formed $NO_2$ is absorbed in subsequent absorbing stages and, wherein the resultant absorbing product is further processed as a solution.

The subject invention, in brief summary, relates to a method for removing nitrogen oxides from waste gases by the treatment of the subject waste gases with an absorbing fluid. The waste gases are thereupon contacted, in the gas phase, with an oxidiziang agent. The $NO_2$ formed thereby is then absorbed in a subsequent absorbing stage. The absorbing product is then further processed as a solution.

The novel features which are considered as characteristic of the invention are set forth in particular in the appended claims. The improved method itself, however, together with additional features and advantages thereof, will be understood upon perusal of the following detailed description of certain specific embodiments with reference to the drawing and example contained therein.

BRIEF DESCRIPTION OF THE DRAWING

The FIGURE illustrates, in schematic form, the method of the subject invention.

DESCRIPTION OF THE PREFERRED EMBODIMENT

The FIGURE illustrates a preferred embodiment of the method of the subject invention wherein nitrogenous waste gases from, for example, a nitric acid production facility 1 are admixed while in their gaseous phase in a conduit 2 with an oxidizing agent, preferably ozone, the oxidizing agent being introduced through a conduit 3 into conduit 2. Waste gases which are emitted from such production facilities as furnaces, nitric acid plants and factories and/or constitute the residual gases of factories or plants which use nitric acid may contain nitrogen oxides in concentration between 200 and 5,000 $mg/m^3$ or even higher.

The oxidizing agent is preferably introduced into conduit 3 in a gaseous form. Sufficient amounts of the oxidizing agent are added in order to effect the desired amount of NO separation. During oxidation in the gas phase, the following chemical reaction occurs when ozone constitutes the oxidizing agent:

$$NO + O_3 \rightarrow NO_2 + O_2$$

The oxidized waste gases are then introduced into washer 4 for a subsequent absorbing stage wherein a requisite amount of an agent is added through conduit 16. Preferred absorbing agents include ammonia and calcium and sodium compounds. By the addition of the oxidizing agent, i.e., ozone, the $NO_x$ is caused to oxidize and become $NO_2$ which can be washed out relatively simply at relatively low temperatures by the addition of the absorbing agent during the absorbing stage. Upon the addition of the absorbing agent, equilibrium occurs in the absorbing stage. For example, when ammonia is added as an absorbing agent, equilibrium occurs between the ammonium nitrate and the ammonium nitrite as per the following chemical reaction:

$$2NO_2 + 2NH_3 + H_2O \rightarrow NH_4NO_2 + NH_4NO_3$$

During the absorbing stage, the water balance is adjusted by the addition of fresh water to the absorbing stage in an amount sufficient to replace vaporized water from the waste gases. The waste gases are maintained at a pH of between about 5.0 and about 10.0 during the absorbing stage and, in a preferred embodiment, between about 7.5 and about 9.5 for preferred $NO_x$ removal. This permits the $NO_2$ formed from the NO by oxidation with the ozone to be washed out in the desired amounts. Thus, the wash solution of the absorbing stage in accordance with the present invention contains nitrites of ammonia, calcium or sodium depending upon the specific absorbing composition used.

After absorption in the absorbing stage, i.e., the washer 4, the formed absorbing product is then introduced through conduit 8 into an oxidation chamber 9 or installation wherein atmospheric oxygen is introduced through conduit 11 and an acid such as, for example, $HNO_3$ or $H_2SO_4$, is introduced through conduit 12 in order to lower the pH to between about 3.0 and about 4.0. The introduction of atmospheric oxygen serves to convert the ammonium nitrite into ammonium nitrate at this pH. The same would likewise take place with calcium nitrite or sodium nitrite. Purified waste gases exit the washer 4 through conduit 5. Waste gases from the oxidation chamber 9 is recirculated through the system, passing back through conduit 15 into the conduit 2 where it then passes into washer 4. The oxidized absorbing product in oxidation chamber 9 is then transmitted through conduit 10 to an injection evaporator 13 for spray drying or crystallization. The resultant dry product is then drawn off through conduit 14.

Spray drying is particularly effective in the cases of ammonium nitrate and sodium nitrate. The resultant powdery product is then pelletized and dried and may be marked separately in this form as a fertilizer. The discharge after oxidation can also be processed in crystallization plants with the thereby resulting crystallization product also being marketed in this form as a fertilizer.

EXAMPLE

In order to demonstrate the effectiveness of the method of the present invention, during the production of nitric acid, 15,000 m$^3$/h of waste gases with a NO content of 2,500 mg/m$^3$ was formed. It was desired that the NO content be reduced to 500 mg/m$^3$.

Using the method of the present invention, in the absorbing stage, 46 kg/h of the NO$_2$ was formed in the gas phase through the addition of ozone, was absorbed and then converted to 64 kg/h NH$_4$NO$_2$ upon the addition of ammonia.

In the subsequent oxidation chamber NH$_4$NO$_2$ was oxidized with the assistance of atmospheric air to form NH$_4$NO$_3$. From the 64 kg/h NH$_4$NO$_2$, approximately 240 kg/h NH$_4$NO$_3$ solution with an approximate share of $\frac{2}{3}$ of water was formed which lead to the spray drying of crystallization stage.

Without further analysis, the foregoing will so fully reveal the gist of the present invention that others can, by applying current knowledge, readily adapt if for various applications without omitting features that, from the standpoint of prior art, fairly constitute essential characteristics of the generic and specific aspects of our contribution to the art and, therefore, such adaptions should and are intended to be comprehended within the meaning and range of equivalence of the claims.

Wherefore, we claim:

1. A method of removing nitrogen oxides from waste gases, comprising the steps of:
   (a) oxidizing the nitrogen oxides in the waste gases by contacting the waste gases in the gas phase with ozone to form NO$_2$;
   (b) contacting the formed NO$_2$ in an absorbing stage with an absorbing agent selected from the group consisting of ammonia, a calcium compound and a sodium compound to form a solution comprising nitrates and nitrites of a cation selected from the group consisting of ammonium, calcium and sodium while substituting fresh water for vaporized water in corresponding amounts during said absorption;
   (c) processing the resultant solution by contacting it with an oxidizing agent in a subsequent oxidation step to oxidize nitrites contained therein and to produce a solution predominantly comprising nitrates selected from the group consisting of ammonium, calcium, and sodium nitrates;
   (d) maintaining the pH of the solution during said oxidation step at between about 3 and about 4 by the addition of an acid selected from the group consisting of nitric acid and sulfuric acid
   (e) drying the resultant solution after said oxidation step; and,
   (f) pelletizing the resultant product.

2. The method of claim 1, wherein said oxidizing agent is ozone.

3. The method of claim 1, wherein the pH of the solution in the absorbing stage is maintained at between 5.0 and about 10.0.

4. The method of claim 3, wherein the pH of the solution in the absorbing stage is maintained at between about 7.5 and 9.5.

* * * * *